US008418081B2

(12) United States Patent
Bartek et al.

(10) Patent No.: US 8,418,081 B2
(45) Date of Patent: Apr. 9, 2013

(54) OPTIMIZING DISPLAY SPACE WITH EXPANDABLE AND COLLAPSIBLE USER INTERFACE CONTROLS

(75) Inventors: Velda A. Bartek, Apex, NC (US); Patrick H. Cox, Jr., Raleigh, NC (US); Richard N. Spinks, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1630 days.

(21) Appl. No.: 10/326,004

(22) Filed: Dec. 18, 2002

(65) Prior Publication Data
US 2004/0119745 A1 Jun. 24, 2004

(51) Int. Cl.
*G06F 3/048* (2006.01)

(52) U.S. Cl.
USPC ........... 715/837; 715/780; 715/792; 715/840; 715/841; 715/846

(58) Field of Classification Search .................. 715/864, 715/780, 823, 824, 507, 733, 792, 837, 840, 715/841, 846
See application file for complete search history.

(56) References Cited

U.S. PATENT DOCUMENTS

| | | | | |
|---|---|---|---|---|
| 5,301,348 A | 4/1994 | Jaaskelainen | | 395/800 |
| 5,317,646 A | 5/1994 | Sang, Jr. et al. | | 382/9 |
| 5,345,550 A | 9/1994 | Bloomfield | | 395/156 |
| 5,564,004 A | 10/1996 | Grossman et al. | | 395/159 |
| 5,588,107 A | * | 12/1996 | Bowden et al. | 715/828 |
| 5,748,927 A | * | 5/1998 | Stein et al. | 715/711 |
| 5,801,703 A | | 9/1998 | Bowden et al. | 345/357 |
| 5,986,657 A | * | 11/1999 | Berteig et al. | 715/792 |
| 6,084,585 A | * | 7/2000 | Kraft et al. | 715/733 |
| 6,097,390 A | * | 8/2000 | Marks | 715/772 |
| 6,111,575 A | | 8/2000 | Martinez et al. | 345/352 |
| 6,369,833 B1 | | 4/2002 | van Liempd et al. | 345/700 |
| 6,380,957 B1 | * | 4/2002 | Banning | 715/828 |
| 6,915,454 B1 | * | 7/2005 | Moore et al. | 714/38 |
| 6,961,756 B1 | * | 11/2005 | Dilsaver et al. | 709/205 |
| 6,976,227 B2 | * | 12/2005 | Kunz | 715/825 |
| 6,993,657 B1 | * | 1/2006 | Renner et al. | 713/182 |
| 7,000,179 B2 | * | 2/2006 | Yankovich et al. | 715/222 |
| 2002/0113810 A1 | * | 8/2002 | Radtke et al. | 345/710 |

(Continued)

OTHER PUBLICATIONS

S.A. Morgan, et al., Implementation of Runtime Object Expansion in an OS/2 Presentation Manager Interface, *IBM Technical Disclosure Bulletin*, vol. 37, No. 03, pp. 329-330, (Mar. 1994).

*Primary Examiner* — Omar Abdul-Ali
*Assistant Examiner* — Sherrod Keaton
(74) *Attorney, Agent, or Firm* — Steven M. Greenberg, Esq.; Carey, Rodriguez, Greenberg & O'Keefe

(57) ABSTRACT

A display space optimized form. The display space optimized form can include one or more user interface input controls individually selected to be collapsed by default when rendered in a GUI. The form further can include one or more user interface input controls individually selected to be expanded by default when rendered in the GUI. One or more twistie controls can be configured in a collapsed position. Specifically, each one of the twistie controls configured in a collapsed position can have an association with one of the user interface input controls individually selected to be collapsed. Finally, one or more twistie controls can be configured in an expanded position. In that regard, each one of the twistie controls configured in an expanded position can have an association with one of the user interface input controls individually selected to be expanded.

19 Claims, 4 Drawing Sheets

U.S. PATENT DOCUMENTS

| | | | |
|---|---|---|---|
| 2002/0120506 A1* | 8/2002 | Hagen | 705/14 |
| 2003/0081007 A1* | 5/2003 | Cyr et al. | 345/804 |
| 2004/0205526 A1* | 10/2004 | Borodovski et al. | 715/505 |
| 2005/0010454 A1* | 1/2005 | Falk et al. | 705/4 |

* cited by examiner

OPTIMIZING DISPLAY SPACE WITH EXPANDABLE AND COLLAPSIBLE USER INTERFACE CONTROLS

BACKGROUND OF THE INVENTION

1. Statement of the Technical Field

The present invention relates to the field of user interface controls and more particularly, to optimizing display space in a graphical user interface.

2. Description of the Related Art

The conventional graphical user interface (GUI) has been widely used for many years. The primary function of the GUI includes providing user interface controls with which the end-user can interact with an underlying application. The common GUI includes many stock user interface controls, most of which, when combined, can accommodate most computer-human interactions required by an application. For example, the static text box control can be used to present text to the end-user while an edit box can permit the user to provide textual input to the application. A radio button control can provide for the exclusive selection of an element from among a field of elements, while a checklist box control can provide for the non-exclusive selection of elements from among a field of elements.

Notably, a twistie control, as is known in the art, can include a iconic element such as an arrow or plus-sign, which when activated can cause a proximately positioned GUI element to expand to full form. Upon deactivation, the proximately positioned GUI element can collapse to a compact form. Concurrently, the iconic element can change its visual presentation so as to indicate the collapsed nature of the proximately positioned GUI element. As an example, in its expanded mode, the iconic element can appear as a downward facing arrow, while in its collapsed mode, the iconic element can appear as a sideways facing arrow. In any case, the toggling action of the twistie control can cause the repeated collapse and expansion of the proximately positioned GUI element.

When user interface controls are displayed in a GUI, often one must compromise between the amount of information which can be displayed within the GUI display, and the amount of displayable space within the GUI display in which a preferred amount of information can be presented. Where the display area must be reduced due to height and width constraints, information that otherwise might be easily grouped and viewed within a larger display space often cannot be presented as a single, cohesive set of interrelated interface controls. This circumstance has been known to arise in the use of pervasive devices, including handheld computers and portable cellular telephones. In the case of pervasive devices, the display area sometimes can be limited to as little as a 160 pixel by 160 pixel region or less.

In illustration of the foregoing deficiency, FIG. 1 is a pictorial illustration of a GUI browser which has rendered a markup language form having several user interface controls. A form 110 can include one or more edit boxes 120 in which an interacting end-user can provide data input 130. Each of the edit boxes 120 can be labeled with a static text control 140. As shown in the exemplary form 110, a text selection box 180 also can be provided from which the interacting end-user can select one textual selection 150 from among many textual selections 160. Also, those edit boxes 120 which are mandatory in nature can have associated therewith an iconic indicator 170 so as to indicate to the end-user that the associated edit box 120 must be completed.

As it will be recognized by one skilled in the art, the sheer vertical length of the exemplary form would require the use of scroll bar controls so as to permit the full use of the form 110 in a limited display area such as that found in a pervasive device. Yet, as will be apparent from the exemplary form 110, though the form 110 includes only twelve interface control fields, most of the length of the form 110 can be attributed to the vertical length of each edit box 120 and text selection box 140. In fact, in the case of the exemplary form 110, a full twenty-seven display lines are consumed by the mere twelve interface control fields.

Notably, user interface designers previously have recognized the inherent problems associated with presenting numerous user interface control elements in a limited display space, albeit those skilled artisans have not considered such problems in the context of the display in a pervasive device. Nevertheless, the problem has been treated in the context of complex menu sub-panels in the GUI of a standalone application. See e.g. U.S. Pat. No. 5,986,657 to Berteig et al., U.S. Pat. No. 5,801,703 to Bowden et al., and U.S. Pat. No. 5,588,107 to Bowden et al.

In each referenced case, however, the solution proposed included the collapsing of the complex menu sub-panels from an expanded state to a collapsed state. As such, the prior art collapsing mechanism collapses and expands all menu controls within the menu sub-panels as an aggregate unit. Individualized control is not possible in this regard. Moreover, in each of the Berteig and Bowden cases, once collapsed the contents of the collapsed menu sub-panel is not apparent from a visual inspection of the GUI alone. Moreover, as none of the foregoing references addresses the problems of individual user input control elements presented in a form, the issue of mandatory fields remains unaddressed by the references.

SUMMARY OF THE INVENTION

The present invention is a method for optimizing display space when presenting a form in a GUI. The method can include identifying individual ones of user interface input controls to be collapsed. Static text labels corresponding to the identified individual ones of the user interface input controls can be displayed as can associated twistie controls. In that regard, each of the associated twistie controls can denote a collapsed user interface input control. Finally, any display of the identified individual ones of the user interface controls can be suppressed so as to display a form which includes a display only of the static text labels for each user interface input control and those user interface input controls which are identified as such.

In a preferred aspect of the invention, the identifying step can include first identifying individual ones of the user interface input controls into which data input is not required to complete the form. Secondly, individual ones of the user interface input controls can be identified into which data input is required to complete the form. Consequently, the displaying step can include suppressing any display of the first identified user interface input controls, while only static text labels corresponding to the suppressed first identified user interface input controls can be displayed along with associated individual twistie controls indicating a collapsed user interface input control. Moreover, the second identified user interface input controls can be displayed along with the corresponding static text labels and additional twistie controls indicating an expanded mandatory user interface input control.

The present invention also can include a display space optimized form. The display space optimized form can include one or more user interface input controls individually selected to be collapsed by default when rendered in a GUI. The form further can include one or more user interface input controls individually selected to be expanded by default when rendered in the GUI. One or more twistie controls can be configured in a collapsed position. Specifically, each one of the twistie controls configured in a collapsed position can have an association with one of the user interface input controls individually selected to be collapsed. Finally, one or more twistie controls can be configured in an expanded position. In that regard, each one of the twistie controls configured in an expanded position can have an association with one of the user interface input controls individually selected to be expanded.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an optimized display space for user interface controls. In the optimized display space, individual user interface controls, such as edit boxes, radio button fields, selection boxes, spinner controls and the like, can be collapsed or expanded as the case may be so that only the static text label describing the contents of the user interface control need be displayed at any one time. In this way, valuable display space in a form can be conserved so that when presenting the form in the limited display area of a pervasive device, the use of scroll-bars or multiple pages to present a form will not be required.

Figure 1:
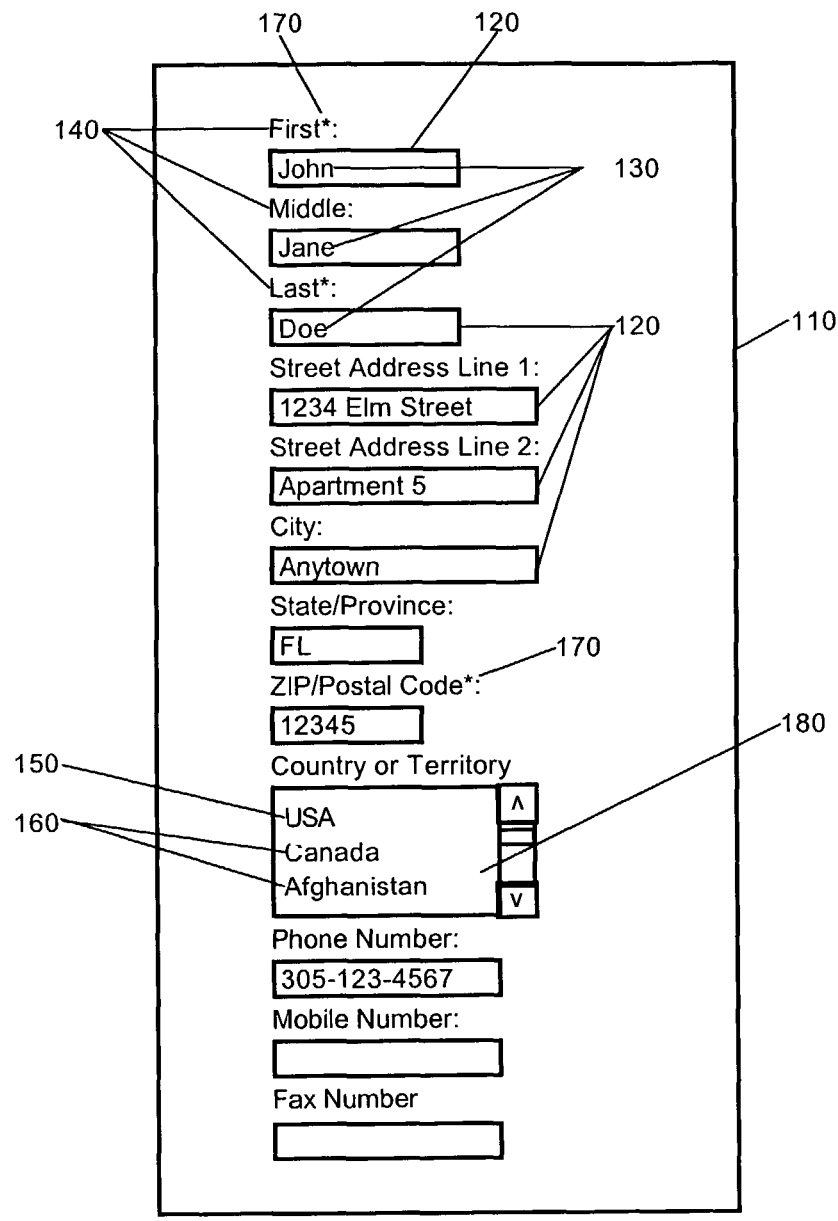
FIG. 1 is an exemplary screen shot of a GUI in which a space-consuming form has been displayed in accordance with the known arts.
Figure 2:
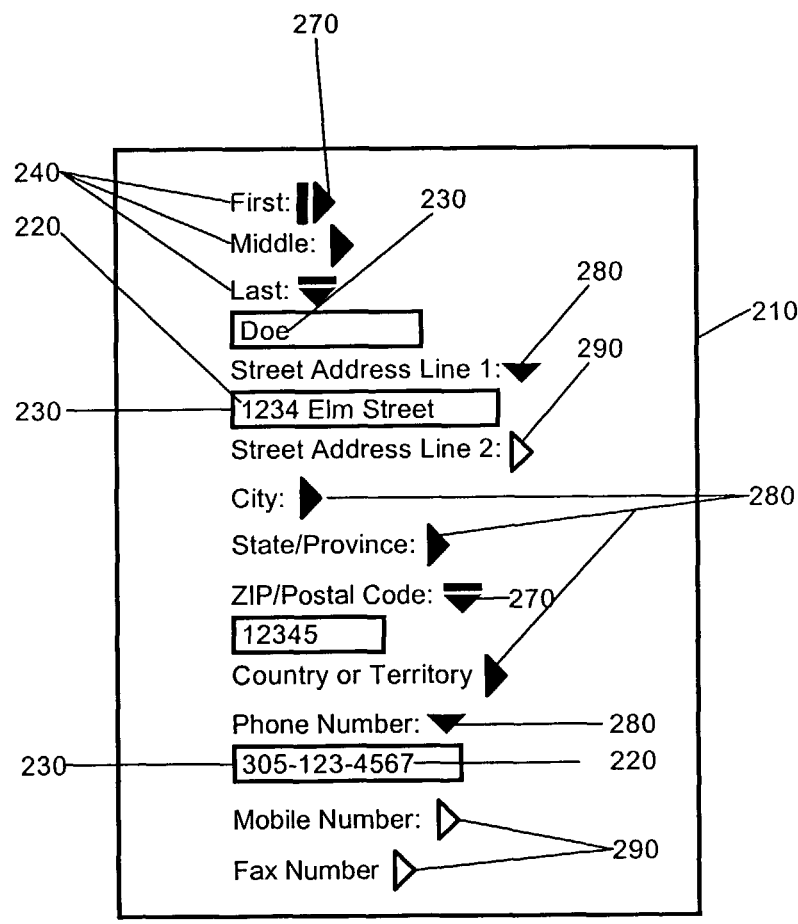
FIG. 2 is an exemplary screen shot of a GUI in which an optimized form has been displayed in accordance with the inventive arrangements.

FIG. 2 is an exemplary screen shot of a GUI in which an optimized form has been displayed in accordance with the inventive arrangements. The form 210 can include a set of edit boxes 220 labeled with a corresponding set of static text fields 240. For exemplary purposes only, some of the edit boxes 220 can include completed data 230, such as the Last Name, Street Address Line 1, ZIP/Postal Code and Phone Number fields. Moreover, the First, Last and ZIP/Postal Code fields can be required fields.

In accordance with the inventive arrangements, all user interface input controls, such as the edit boxes 220 of FIG. 2 can be placed in a collapsed state, having only their respective static text labels 240 visible to the end-user. In this way, valuable display space can be conserved without prejudicing the ability of the end-user to recognize the number and nature of the user interface input controls present in the form 210. For example, as it will be apparent from the exemplary configuration of FIG. 2, the First, Middle, Street Address Line 2, City, State/Province, Country or Territory, Mobile Number and Fax Number fields each can be collapsed leaving only their respective static text labels 240 visible in the form 210.

In accordance with a preferred aspect of the inventive arrangement, to indicate to the end-user that a respective user interface input control has been collapsed, a twistie control 270, 280, 290 can be placed proximately to the static text label 240 of a collapsed user interface input control. As it will be recognized by one skilled in the art, the orientation of the twistie control 270, 280, 290 can indicate to the end-user whether the associated user interface input control has been expanded or collapsed. Importantly, the skilled artisan will recognize from the exemplary configuration of FIG. 2 that multiple twistie types can be associated with a particular user interface input control in accordance with the present invention.

In that regard, where a respective user interface input control is a required field which must be completed by the end-user, a bar twistie 270 can be placed adjacent to the corresponding static text label 240 to indicate the mandatory nature of the user interface input control. As an example, in FIG. 2, the First and Last fields, as well as the ZIP/Postal Code field are to be considered mandatory or required as will be apparent from the associated bar twistie 270.

By comparison, where a corresponding user interface input control is not to be considered mandatory, either a filled or unfilled twistie, 280, 290 can be used instead. The filled twistie 280 can be used to indicate a user interface input control into which data already has been provided, either by default or through user interaction. In contrast, the unfilled twistie 290 can be used to denote a user interface input control into which no data has yet to be provided. In FIG. 2, for instance, each of the Street Address Line 2, Mobile Number, and Fax Number fields incorporate an unfilled twistie 290 to indicate that the associated edit boxes 220 remain empty.

Figure 3:
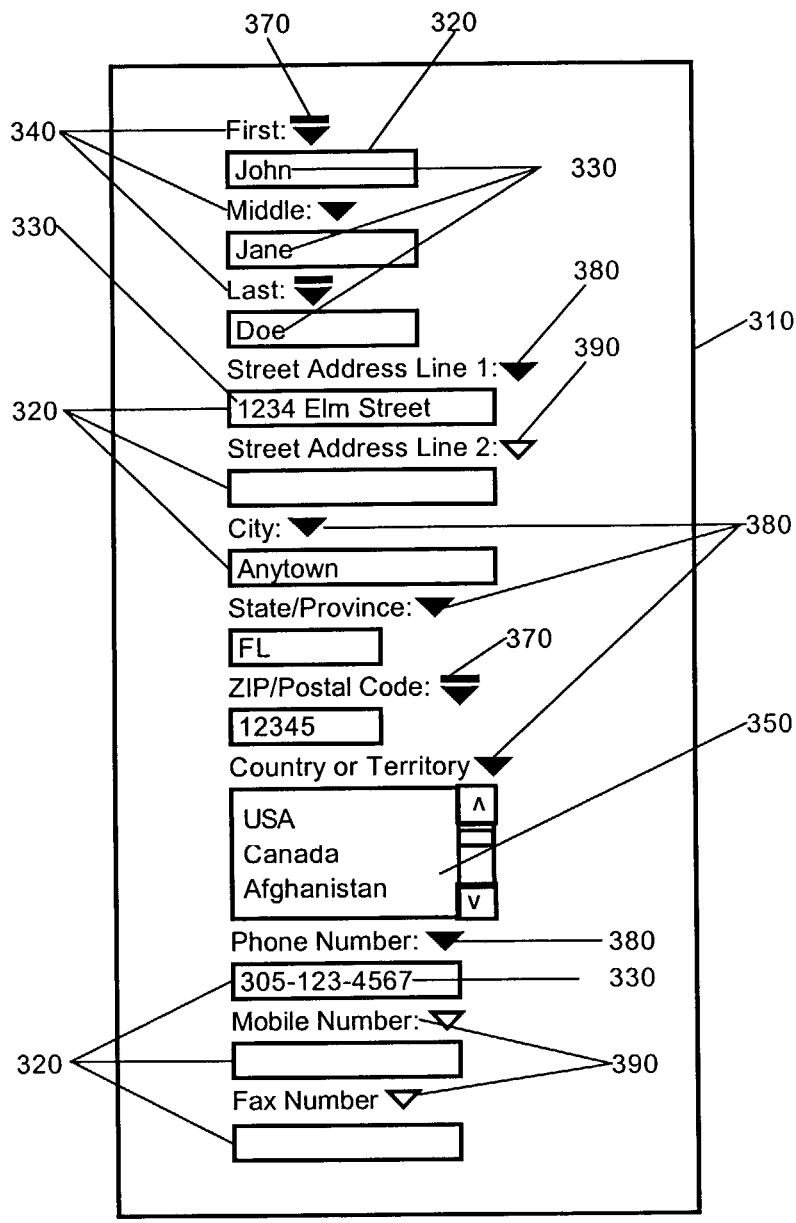
FIG. 3 is an exemplary screen shot of a GUI in which the optimized form of FIG. 2 has been fully expanded in accordance with the inventive arrangements; and, FIG. 4 is a flow chart illustrating a process for displaying the optimized form of FIG. 2.

FIG. 3 is an exemplary screen shot of a GUI in which the optimized form of FIG. 2 has been fully expanded in accordance with the inventive arrangements. As will be apparent from the form 310 of FIG. 3, each of the user interface input controls, including edit boxes 320 and selection boxes 350 can have associated therewith both a static text label 340 and a corresponding twistie 370, 380, 390. Also, some of the user interface input controls can include data 330.

It will be recognized by one skilled in the art that by collapsing one or more of the user interface input control in the form 310, a substantial amount of display space can be conserved. Moreover, the amount of display space conserved by the form 310 can be directly related to the individual combinations of collapsed and expanded user interface input controls selected by the end-user. In this regard, unlike prior art screen space conservation techniques, in the present invention, control over screen space savings can be engaged at a granular, individual user interface input control level.

Figure 4:
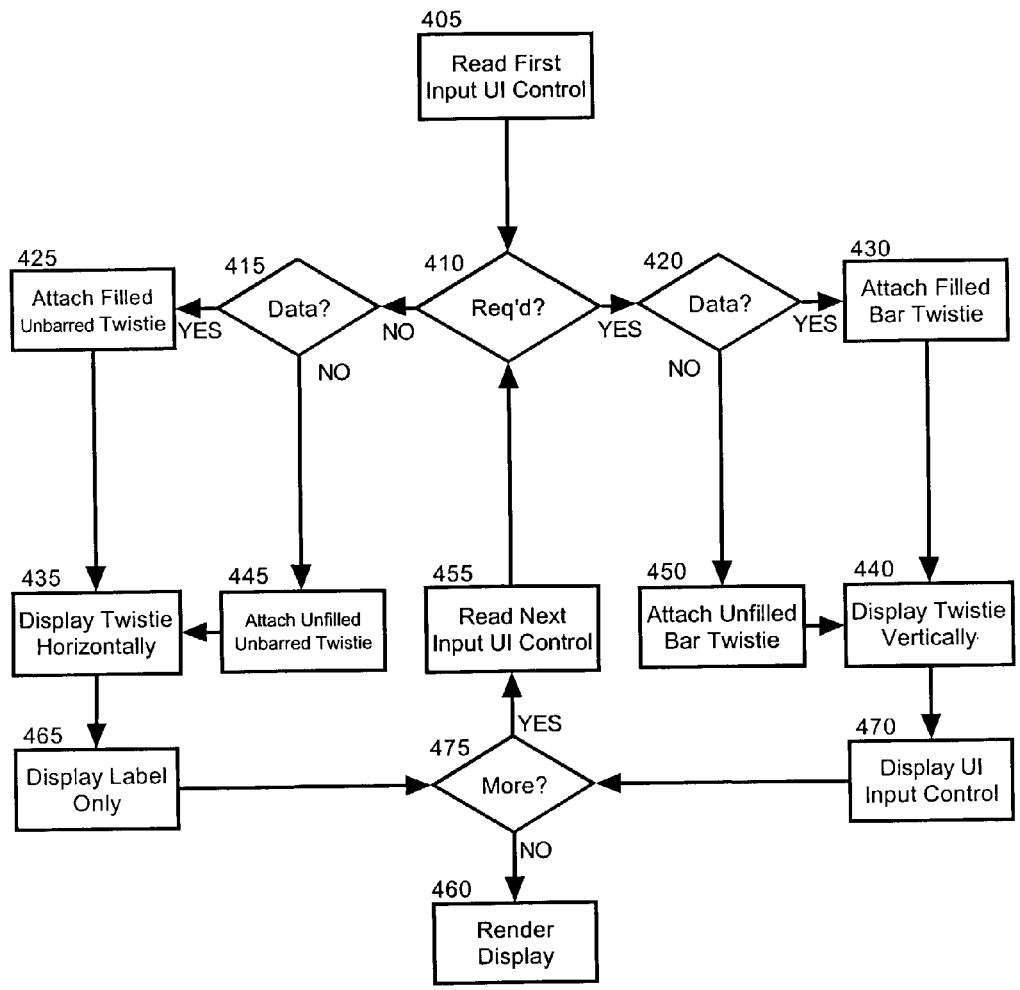

FIG. 4 is a flow chart illustrating a process for displaying the optimized form of FIG. 2. Prior to loading and presenting a form in a GUI, first, each of the user interface input controls can be examined to determine which are mandatory and which already include data, either by virtue of a pre-configuration, by a pre-specification such as by way of a cookie or data included in an invoking reference, or by virtue of user supplied input. Depending upon outcome of the examination for each user interface input control, selected ones of the user interface input controls can be displayed in either a collapsed or expanded mode, with corresponding twisties—either filled, unfilled, barred or unbarred.

Beginning in block 405, a first user interface input control can be examined. In decision block 410, if the user interface input control is deemed mandatory, in decision block 410 it further can be determined whether the user interface input control has been completed with some data. If not, in block 450 an unfilled bar twistie can be associated with the user interface input control. Otherwise, in block 430 a filled bar twistie can be associated with the user interface control. In either case, in block 440 the twistie can be assigned a vertical orientation and in block 470 the user interface input control can be displayed along with the twistie.

As it will be recognized by one skilled in the art, in the preferred aspect of the invention, mandatory user interface input controls by default are automatically displayed along with their respective static labels so as to strongly remind the end-user that the user interface input control ought to be completed before proceeding. By comparison, those user interface input controls which are not required can be collapsed by default as it will be recognized hereafter in the textual discussion of steps 415, 425, 435, 445, and 465. In any event, the foregoing process is merely a preferred process and the invention is not so limited as it is presented. Rather, in alternative embodiments, all of the user interface input controls can be collapsed by default, or any other combination of controls can be collapsed and expanded by default.

Returning now to FIG. 4, if in decision block 410, the user interface input control under examination is not a required field, in decision block 415 it further can be determined whether the user interface input control has been completed with some data. If not, in block 445 an unfilled unbarred twistie can be associated with the user interface input control. Otherwise, in block 425 a filled unbarred twistie can be associated with the user interface control. In either case, in block 435 the twistie can be assigned a horizontal orientation and in block 465 only the static text label corresponding to the user interface input control can be displayed along with the twistie.

In all cases, in decision block 475 it can be determined whether additional user interface input controls remain to be examined in the form. If not, in block 460 the entire form can be rendered in the display. Otherwise, in block 455 the next user interface input control in the form can be examined and the process can repeat in blocks 410 through 475. In any event, once all of the user interface input controls have been examined and the form properly rendered, an optimized display of the form can be produced which will not necessarily consume an excess portion of the display space. Yet the novel placement of distinguishing twisties can indicate to the end-user on a control by control basis whether associated controls are mandatory in nature and whether such controls already have been completed.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embodied in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for optimizing display space when presenting a form comprising a plurality of user interface input controls and corresponding labels in the display space, comprising:

identifying individual ones of the user interface input controls to be collapsed;

displaying labels, within respective static text box controls, corresponding to said identified individual ones of the user interface input controls along with associated twistie controls placed proximately to the corresponding labels, an orientation of each said associated twistie control indicating whether the associated user interface input control has been expanded or collapsed; and in response to a twistie control being in an orientation indicating that the corresponding user interface input control is collapsed, suppressing display of all of the user interface input control but not the label associated with said twistie control.

2. The method of claim 1, further comprising displaying others of the user interface input controls not identified to be collapsed with additional twistie controls differing visually from said associated twistie controls.

3. The method of claim 1, wherein said identifying comprises:

first identifying individual ones of the user interface input controls into which data input is not required to complete the form; and second identifying individual ones of the user interface input controls into which data input is required to complete the form.

4. The method of claim 3, wherein said displaying comprises:

suppressing display of all said first identified user interface input controls;

displaying only labels, within respective static text box controls, corresponding to said suppressed first identified user interface input controls with associated individual twistie controls indicating a collapsed user interface input control; and displaying said second identified user interface input controls along with said corresponding labels and additional associated twistie controls indicating an expanded mandatory user interface input control.

5. The method of claim 3, wherein said displaying comprises:

suppressing display of all said first and second identified user interface input controls;

displaying only labels, within respective static text box controls, corresponding to said suppressed first and second identified user interface input controls;

further displaying with said labels corresponding to said suppressed first identified user interface input controls, associated individual twistie controls, each said associated individual twistie control indicating a collapsed non-mandatory user interface input control; and yet further displaying with said labels corresponding to said suppressed second identified user interface input controls, additional individual twistie controls, each said additional individual twistie control indicating a collapsed mandatory user interface input control.

6. The method of claim 4, further comprising:
determining whether one or more of said user interface input controls already contain data; and
displaying said associated and additional twistie controls so as to indicate whether said user interface input controls already contain data.

7. The method of claim 5, further comprising:
determining whether one or more of said user interface input controls already contain data; and
displaying said associated and additional twistie controls so as to indicate whether said user interface input controls already contain data.

8. A system for optimizing display space when presenting a form comprising a plurality of user interface input controls and corresponding labels in the display space, comprising:
a processor configured to perform:
identifying individual ones of the user interface input controls to be collapsed;
displaying labels, within respective static text box controls, corresponding to said identified individual ones of the user interface input controls along with associated twistie controls placed proximately to the corresponding labels, an orientation of each said associated twistie control indicating whether the associated user interface input control has been expanded or collapsed; and
in response to a twistie control being in an orientation indicating that the corresponding user interface input control is collapsed, suppressing display of all of the user interface input control but not the label associated with said twistie control.

9. The system of claim 8, wherein
each one of said twistie controls configured in a collapsed position comprises a visual characteristic denoting whether said associated respective one of said user interface input controls already contains data.

10. The system of claim 8, wherein
each one of said twistie controls configured in a collapsed position comprises a visual characteristic denoting whether said associated respective one of said user interface input controls has been configured as a required field.

11. A computer program product comprising a non-transitory computer readable medium having stored thereon a computer program for optimizing display space when presenting a form comprising a plurality of user interface input controls and corresponding labels in the display space, the computer program comprising a routine set of instructions, which when executed by a machine, cause the machine to perform the operations of:
identifying individual ones of the user interface input controls to be collapsed;
displaying labels, within respective static text box controls, corresponding to said identified individual ones of the user interface input controls along with associated twistie controls placed proximately to the corresponding labels, an orientation of each said associated twistie control indicating whether the associated user interface input control has been expanded or collapsed; and
in response to a twistie control being in an orientation indicating that the corresponding user interface input control is collapsed, suppressing display of all of the user interface input control but not the label associated with said twistie control.

12. The computer program product of claim 11, further comprising
displaying others of the user interface input controls not identified to be collapsed with additional twistie controls differing visually from said associated twistie controls.

13. The computer program product of claim 11, wherein said identifying step comprises the steps of:
first identifying individual ones of the user interface input controls into which data input is not required to complete the form; and
second identifying individual ones of the user interface input controls into which data input is required to complete the form.

14. The computer program product of claim 13, wherein said displaying comprises:
suppressing display of all said first identified user interface input controls;
displaying only labels, within respective static text box controls, corresponding to said suppressed first identified user interface input controls with associated individual twistie controls indicating a collapsed user interface input control; and
displaying said second identified user interface input controls along with said corresponding labels and additional associated twistie controls indicating an expanded mandatory user interface input control.

15. The computer program product of claim 13, wherein said displaying comprises:
suppressing display of all said first and second identified user interface input controls;
displaying only labels, within respective static text box controls, corresponding to said suppressed first and second identified user interface input controls;
further displaying with said labels corresponding to said suppressed first identified user interface input controls, associated individual twistie controls, each said associated individual twistie control indicating a collapsed non-mandatory user interface input control; and
yet further displaying with said labels corresponding to said suppressed second identified user interface input controls, additional individual twistie controls, each said additional individual twistie control indicating a collapsed mandatory user interface input control.

16. The computer program product of claim 14, further comprising:
determining whether one or more of said user interface input controls already contain data; and
displaying said associated and additional twistie controls so as to indicate whether said user interface input controls already contain data.

17. The computer program product of claim 15, further comprising:
determining whether one or more of said user interface input controls already contain data; and
displaying said associated and additional twistie controls so as to indicate whether said user interface input controls already contain data.

18. The method of claim 1, further comprising
displaying the label associated with said one of said twistie controls while the display of all of the user interface input control associated with said one of said twistie controls is suppressed.

19. The computer program product of claim 11, further comprising displaying the label associated with said one of said twistie controls while the display of all of the user interface input control associated with said one of said twistie controls is suppressed.

* * * * *